Nov. 10, 1959

L. C. URES 2,912,525

ELECTRICAL CORD RETRACTOR

Filed Nov. 10, 1955

Lewis C. Ures
INVENTOR.

BY

Nov. 10, 1959 L. C. URES 2,912,525
ELECTRICAL CORD RETRACTOR
Filed Nov. 10, 1955 3 Sheets-Sheet 2

Lewis C. Ures
INVENTOR.

Nov. 10, 1959  L. C. URES  2,912,525
ELECTRICAL CORD RETRACTOR
Filed Nov. 10, 1955  3 Sheets-Sheet 3

Lewis C. Ures
INVENTOR.

BY *(signatures)*
Attorneys

United States Patent Office 2,912,525
Patented Nov. 10, 1959

2,912,525

ELECTRICAL CORD RETRACTOR

Lewis C. Ures, Richmond, Calif.

Application November 10, 1955, Serial No. 546,099

5 Claims. (Cl. 191—12.2)

This invention relates to electric cord supply and retracting devices.

Many appliances require electrical cords, some of which are separable from the appliance. These separable cords are often misplaced and at best, they present a small handling and storage problem. An object of the invention is to provide a device primarily designed to fit in a wall, wherein an electrical cord is stored on a drum so that when it is desired to use one of these appliances the cord may be pulled from the drum mounted within the wall and used. When the cord is not necessary a brake which holds the drum in a desired position automatically is released permitting the drum which is under a spring load, to return the cord to a concealed position within the wall.

A more specific object of the invention is to provide an improvement in a self winding electrical cord retractor, the improvement consisting of a novel combination brake and door latch operator whereby upon actuation of the operator the door is automatically unlatched and the brake simultaneously released. In this way a single finger operated member is required to serve the dual purpose described above.

A further object of the present invention is to provide an electrical cord on a drum which is mounted for rotation, the drum being part of a compact unit which is insertable in an aperture in a wall, although the same unit may be attached to an electrical appliance, for example, a vacuum cleaner, clothes dryer or others, the unit being provided with a brake which is easily released and which prevents the spring loaded drum from being rotated in such direction as to withdraw the electrical cord.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
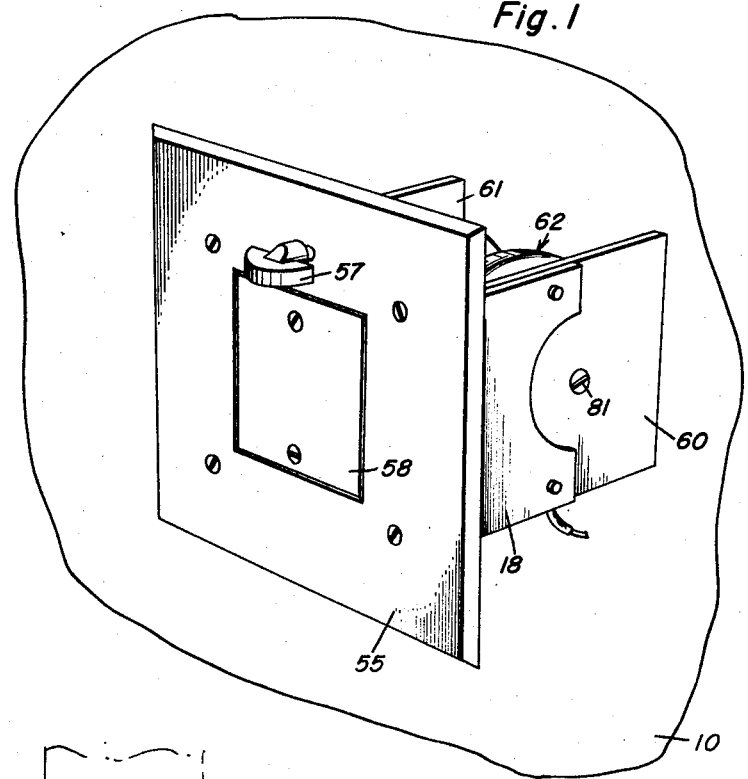
Figure 1 is a perspective view of the electrical cord unit mounted flush with the outer surface of a wall.
Figure 2:
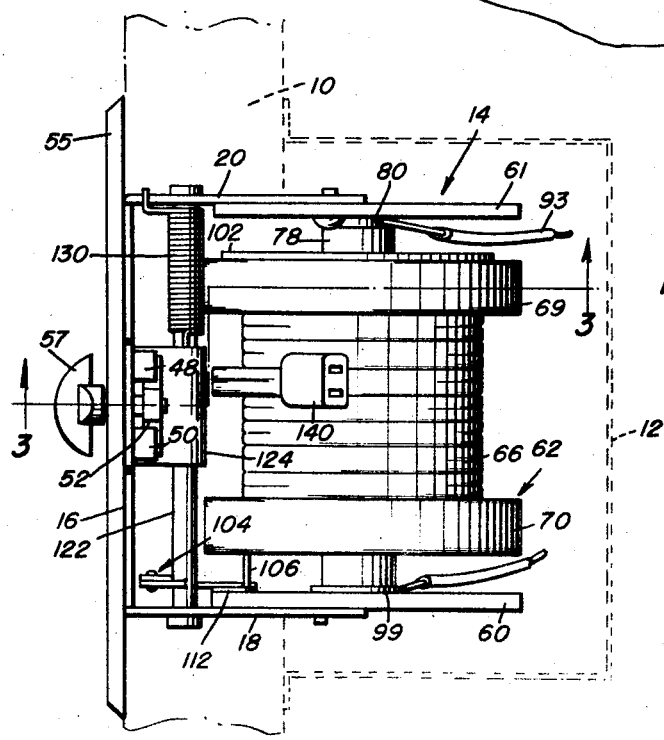
Figure 2 is a plan view of the structure in Figure 1.

In the accompanying drawings there is a wall 10 provided with an opening behind which there is an electrical outlet box 12. The electrical cord storage and supply device 14 is shown (Figure 2) mounted in the outlet box 12 inasmuch as this is the preferred use of the device. Others may be adopted as found desirable.

Figure 3:
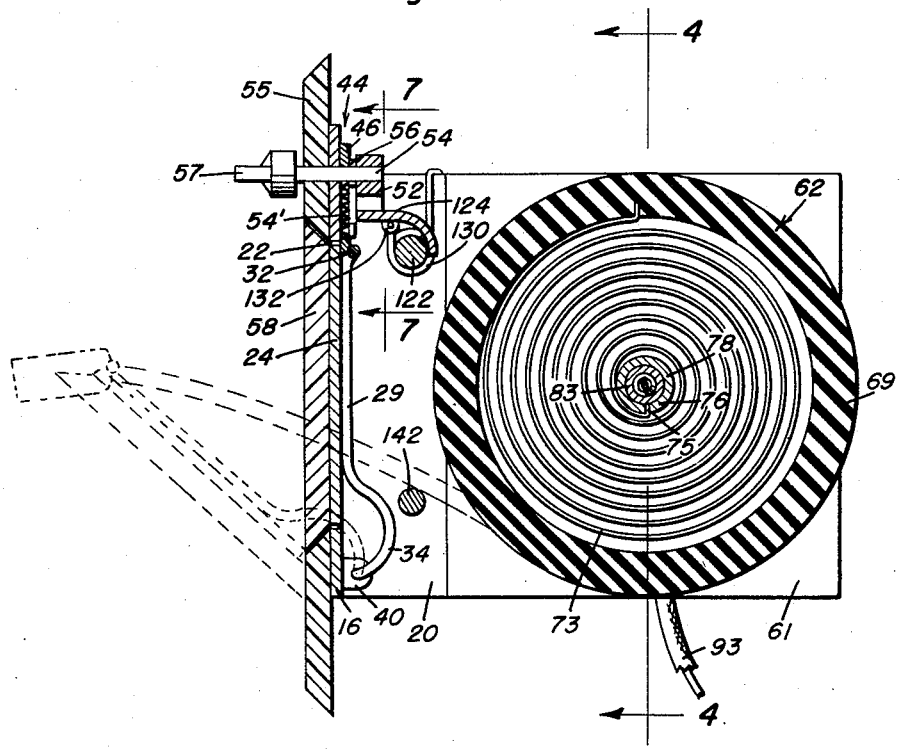
Figure 3 is an irregular sectional view taken on the line 3—3 of Figure 2 and in the direction of the arrows.
Figure 4:
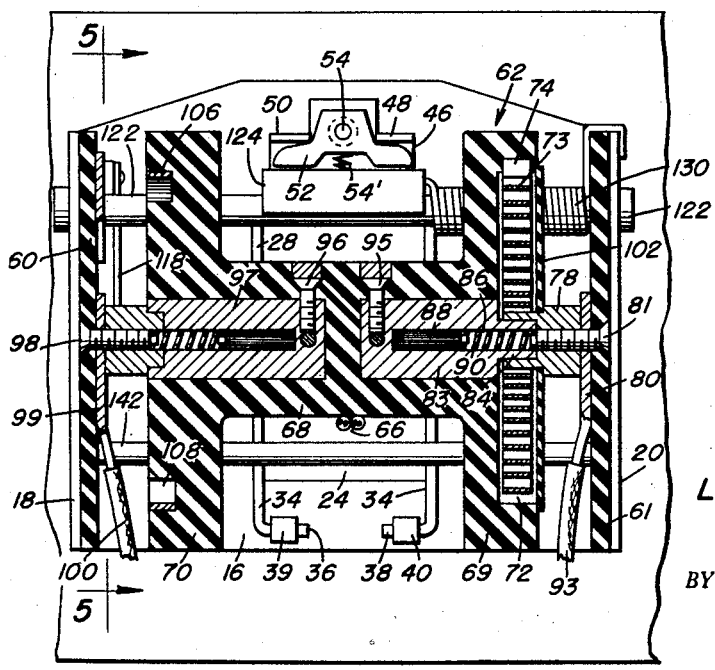
Figure 4 is a sectional view taken substantially on the line 4—4 of Figure 3 and in the direction of the arrows.

The device 14 comprises a generally U-shaped frame having a front 16 together with sides 18 and 20. A frontal aperture 22 is formed in the front 16 in which there is a door 24. This door is hinged to swing open by means of a spring 26. This spring is approximately U-shaped including sides 28 and 29 together with an end 30 which connects the sides 28 and 29. This end has a bight 32 in it which functions as a striker plate. The opposite ends of the sides 28 and 29 have curved parts 34 adjacent to the inwardly directed ends 36 and 38 that are carried in the eyes 39 and 40 that are fixed to the front plate 16. Spring 26 normally biases the door 24 outwardly of its opening 22 (Figure 3). Accordingly latch 44 at the top part of door 24 retains the door in the closed position. This latch comprises a keeper plate 46 that is slidable on the back surface of front plate 16 and that has a lower edge which is engageable with the striker 32 in order to hold the door 24 in the closed position. Right angle tabs 48 and 50 extend from the upper edge of plate 46 and are adapted to be lifted by the actuator 52 in operation of the latch 44. Keeper plate 46 has a slot 53 in it for accommodating the spring 54' that bears on the bottom surface thereof. The upper end of the spring comes to rest on shaft 54, the latter being passed through an aperture in the top part of front 16, the plastic or other usual material cover 55 and in the actuator 52 to which the shaft 54 is keyed or otherwise fixed. A spacer 56 is disposed between the rear surface of the actuator 52 and the front surface of the plate 46, the spacer being mounted on the shaft 54. Actuator 52 is in the form of a lever that is pivoted intermediate its ends with the ends being juxtaposed with respect to the tabs 48 and 50 so that upon rotation of the knob 57 on the end of the shaft 54 in either direction either end of the lever comes to bear against one of the tabs 48 or 50 in order to raise the plate 46 against the returning force of spring 54'. The length of the slot 53 will govern the extent of travel of the plate 46 whose lower end becomes fitted behind the striker plate 52 and the rear surface of the door 24. This door has a cover 58 screwed or otherwise fixed to it, the cover being of the same material as the outlet box cover 55 in order to form a finished unit.

The sides 18 and 20 of the frame have electrically insulating extensions 60 and 61 secured to them by screws or other fasteners. An electrically insulating drum 62 is mounted for rotation between the sides of the frame and between the extensions 60 and 61 thereof. An electrical cord 66 is wound around the reduced center section 68 of drum 62 while the insulating ends 69 and 70 of the drum retain the electrical cord 66 in place on the drum.

Drum 62 is of special construction. An annular recess 72 is formed in the face of end 69 and has a spring 73 disposed thereon. One end 74 of the spring is anchored in the material of the drum 62, while the other end 75 is located in a slot 76 formed in bearing 78. Bearing 78 has a surface which bears against contact 80, the latter fitting flush against the inner surface of side extension 61. The bearing 78 is held fixed in place by means of a screw 81 that is threaded thereinto and which passes through aligned openings in the contact 80 and in the side extension 61. An electrically conductive insert 83 is disposed in the drum 62 and has a reduced cylindrical end 84 which is fitted in the bore of bearing 78. Bushing 83 has a cylindrical bore 86 in which there is a brush, for example carbon, together with a spring 90 that bears against the conductive brush and against the inner end of screw 84. This establishes electrical continuity from the wire 93 that is secured to contact 80 to the bushing 83 and assures good contact even when the drum 62 is being rotated. One side of the cord 66 is passed into an opening formed in the center part 68 of drum 62 and in bushing 83. A set screw 95 in the bushing 83 holds that side of the cord fastened in place. A set screw 96 holds the other side of the cord 66 fastened to the bushing 97 which is identical in construction and function to the bushing 83. The bushing 97 has a brush and spring in it which coacts with anchoring screw 98 in order to hold the contact 99 in place and assembled. The opposite side 100 of the line is attached to the contact 99 whereby the appliance cord 66 becomes a conductor of electrical energy. In order to prevent shorting a non-conductive cover 102 is mounted on the bearing 78 and covers the recess 72 together with the spring 73 that is located in it.

The brake 104 consists of a brake band 106 that is mounted in a circular groove 108 in the outer face of the end 70 of the drum 62. The end of the brake band 106 is secured to a pin 110, the latter being anchored on the mounting plate 112. The mounting plate is screwed or otherwise fixed to the side 18 of the frame. A pin 114 is secured to the opposite end of the brake band 106 and is movable in that it is mounted at one end of rocker 116. A pivot intermediate the ends of rocker 116 attaches the rocker to the mounting plate 112. The inner end of rocker 116 has a link 118 pivoted to it, this link being pivotally connected to the arm 120 that projects from spindle 122. An actuator for the spindle 122 is attached to it and preferably consists of a plate 124 that is fixed to it. This plate projects to a position beneath latch actuator 52 so that upon operation of actuator 52, the plate 124 is depressed thereby rotating spindle 122. This plate 124 is located adjacent to the tabs 126 and 128 that are struck from the front plate 16 and which form guideways for the actuation of keeper plate 46. The ends of the spindle 122 are mounted in apertures formed in the sides 18 and 20 of the frame. A torsion spring 130 is mounted on the spindle 122 and one end is hooked over the top edge of side 20. The opposite end of this spring 130 is placed in an eye 132 on the undersurface of actuator plate 124. The spring 130 applies a yielding force in torsion on spindle 122 in such direction as to keep the brake band 106 pressed against one wall of the groove 108. Accordingly the brake 104 is normally applied and upon rotation of the knob 57 the brake 104 through the intermediate linkage and brake actuation mechanism, is released permitting the free travel of the drum 62 on its bearings.

Figure 7:
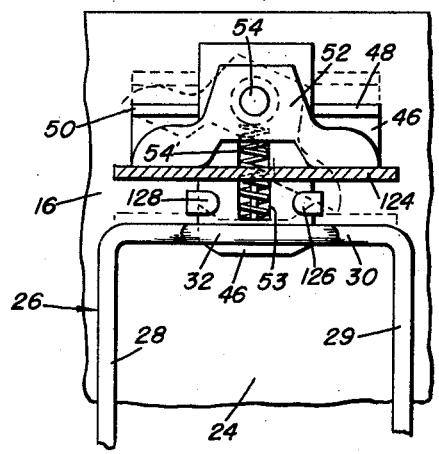
Figure 7 is an enlarged fragmentary sectional view showing particularly the means for simultaneously releasing the door latch and releasing the brake for the line cord drum and taken substantially on the line 7—7 of Figure 3 and in the direction of the arrows.

In operation the cord 66 is assumed to be wound on drum 62 and the entire device mounted in an electrical outlet box 12 in a wall. When it is desired to utilize the cord 66, the knob 57 is rotated either clockwise or counterclockwise. In rotating the knob 57 the latch actuator 52 is caused to rotate with shaft 54 thereby depressing actuator 124 and lifting the keeper plate 46 (Figure 7). In this regard the depressing of the actuator plate 124 is not particularly important, however, the lifting of the keeper plate 46 is, inasmuch as this frees the spring 26 to open the door 24 by swinging it outwardly as shown in Figure 3. Although the cord 66 may be fitted with any type of standard connector at the end thereof, the receptacle 140 is illustrated. This receptacle is grasped and the cord 66 is pulled over the cord guide 142 which consists of bar extending transversely across the sides 18 and 20 and secured to each. While the cord is being payed out from the drum 62 the knob 57 may be rotated in such direction as to release the brake 104. If this is not desired the cord may be pulled with sufficient force to override the brake 104. As the drum 62 is rotated in paying out the electrical cord 66 the spring 73 is wound tight. When the desired length of electrical cord 66 is withdrawn receptacle 140 is plugged into the appliance and used.

In order to return the cord 66 the receptacle 140 is disconnected from the appliance. Then the knob 57 is rotated in order to rock the spindle 122 enough to release the brake band 106 from engagement with one wall of the groove 108. This permits the spring 73 to return the drum 62 to the initial, starting position. Thereafter door 24 with the face panel 58 thereon is returned with the keeper plate 46 engaging between the striker part 32 and one surface of the door 24 thereby holding the door 24 in the latched position.

Figure 5:
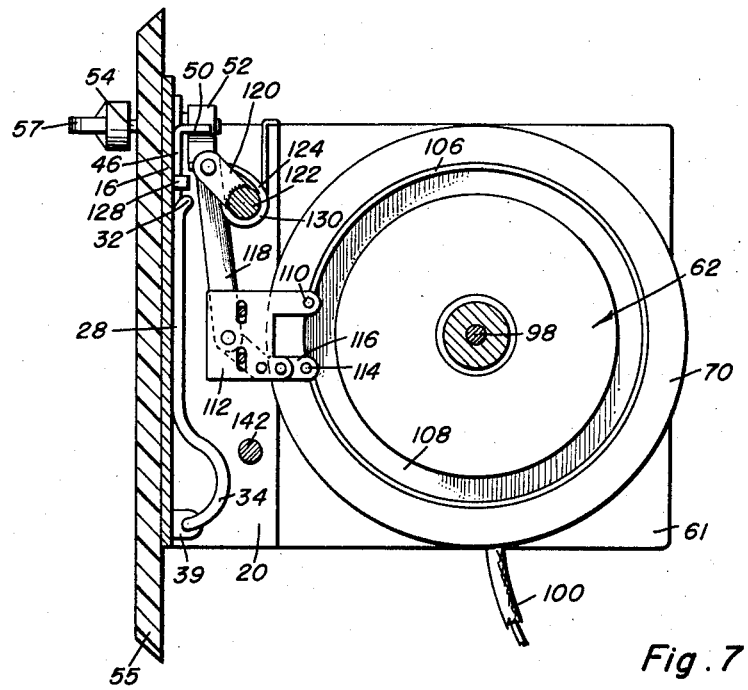
Figure 5 is a vertical sectional view taken on the line 5—5 of Figure 4 and in the direction of the arrows.
Figure 6:
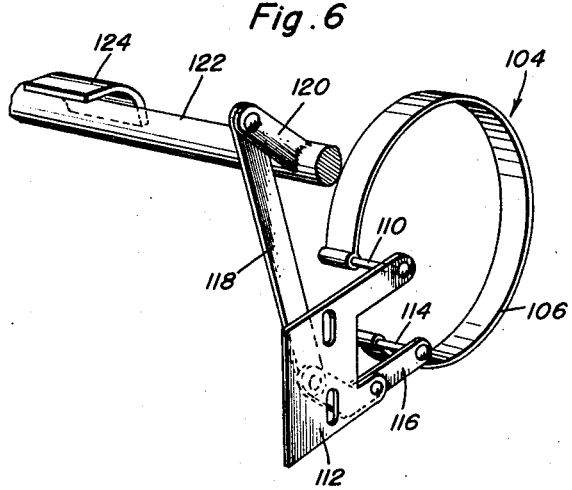
Figure 6 is a perspective view of the brake mechanism which constitutes a part of the invention.

Although the brake 104 consisting of a band with operating linkage operates satisfactorily and smoothly, a positive type brake may be substituted. In this connection the arm 120 (Figure 5) would be attached to the other side of spindle 122 and made as a ratchet dog that is normally biased by spring 130 reacting on spindle 122 as presently illustrated, against teeth which are formed in the periphery of the end 70 of the drum 62. Then the brake band 104 together with all of its operating mechanism may be omitted. When the ratchet brake is used the drum 62 will override the brake when rotated in one direction and will be positively held against rotation in the opposite direction by engagement of the dog with the teeth formed in the periphery of end 70. In order to release the brake for allowing rotation of the drum 62 in this last discussed direction, the actuator plate 124 is displaced by the actuator lever 52 in the manner previously described.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an electrical cord storage device, a drum on which the cord is wound, means on said storage device mounting said drum in the latter for rotation, a spring motor means connected to said drum and to said mounting means and tensioned therebetween to normally rotate the drum in one direction in order to wind the cord thereon, a brake means mounted upon said storage device and connected to said drum to be selectively engageable and releasable with the drum to control the rotation of the drum, said storage device including a wall having an opening therein and a door controlling said opening and mounted upon said wall, said door being disposed opposite said drum, a latch engaging a portion of the door and a portion of said wall for releasably retaining the door in closed position, said latch being mounted upon one of said portions, operating means connected to said brake and to said latch to simultaneously open the door and release the brake for simultaneously releasing said brake and latch.

2. The combination of claim 1 wherein said last mentioned means includes a spindle mounted and journaled on said storage device, an arm extending laterally from said spindle and rigid therewith, a linkage connected to said arm and to said brake means for actuating the latter.

3. The combination of claim 2 wherein said door has a striker plate mounted thereon, said latch including a keeper movably mounted on said wall and engageable with said striker plate to hold said door in closed position, an actuator means connected to said keeper and to said spindle for simultaneously releasing the latch and brake.

4. The combination of claim 1 wherein said storage device includes a frame having sides, said drum mounting means including electrically insulating members secured to said sides, said drum being of electrically insulating material, means carried by said drum for attaching one end of said electric cord thereto and for retaining the wires of said end isolated from each other, means supplying electric current to said cord.

5. The combination of claim 4 wherein said operating means includes a spindle rotatably mounted and journaled on said storage device, an arm extending laterally from said spindle and rigid therewith, a linkage connected to said arm and to said brake for actuating the latter, a spring connected to said spindle and reacting against said frame and yieldingly rotating said spindle in a direction to effect engagement of said brake means to said drum.

References Cited in the file of this patent

UNITED STATES PATENTS

| Re. 23,791 | Alderson et al. | Mar. 2, 1954 |
| 906,045 | Martin | Dec. 8, 1908 |
| 1,271,872 | Eleyet | July 9, 1918 |
| 1,294,884 | Dixon | Feb. 18, 1919 |
| 1,363,417 | Hunt | Dec. 28, 1920 |
| 1,552,095 | Tilton | Sept. 1, 1925 |
| 1,648,582 | Dodge | Nov. 8, 1927 |
| 1,653,277 | Hart | Dec. 20, 1927 |
| 1,806,549 | Wallace | May 19, 1931 |
| 1,839,099 | Helmke | Dec. 29, 1931 |
| 1,875,436 | Frese | Sept. 6, 1932 |
| 1,882,385 | Johnson | Oct. 11, 1932 |
| 2,108,170 | Johnson | Feb. 15, 1938 |
| 2,133,551 | Logan | Oct. 18, 1938 |
| 2,159,004 | Bosch | May 23, 1939 |
| 2,440,719 | Karp et al. | May 4, 1948 |
| 2,450,257 | Simmons | Sept. 28, 1948 |
| 2,603,430 | Hofer | July 15, 1952 |
| 2,708,977 | Scheppe | May 24, 1955 |